(12) United States Patent
Legeais et al.

(10) Patent No.: US 12,103,714 B2
(45) Date of Patent: Oct. 1, 2024

(54) THERMOPLASTIC MOULDED PART, METHOD FOR MANUFACTURING SAME, AND DUCT INCORPORATING SAME

(71) Applicant: HUTCHINSON, Paris (FR)

(72) Inventors: Pierre Legeais, Joue les Tours (FR); Baptiste Voillequin, Bois le Roi (FR)

(73) Assignee: HUTCHINSON, Paris (FR)

( * ) Notice: Subject to any disclaimer, the term of this patent is extended or adjusted under 35 U.S.C. 154(b) by 842 days.

(21) Appl. No.: 17/224,252

(22) Filed: Apr. 7, 2021

(65) Prior Publication Data

US 2021/0316887 A1    Oct. 14, 2021

(51) Int. Cl.
| | |
|---|---|
| *F16L 11/11* | (2006.01) |
| *B29B 15/12* | (2006.01) |
| *B29C 70/08* | (2006.01) |
| *B64D 13/06* | (2006.01) |
| *B64G 1/48* | (2006.01) |
| *B29K 101/12* | (2006.01) |

(52) U.S. Cl.
CPC ............. *B64G 1/48* (2013.01); *B29B 15/122* (2013.01); *B29C 70/085* (2013.01); *B64D 13/06* (2013.01); *B29K 2101/12* (2013.01); *B64D 2013/0625* (2013.01); *F16L 11/11* (2013.01)

(58) Field of Classification Search
CPC .................................................... F16L 11/121
USPC .......................... 138/121, 122, 173, 177, 178
See application file for complete search history.

(56) References Cited

U.S. PATENT DOCUMENTS

| | | | |
|---|---|---|---|
| 4,576,207 A * | 3/1986 | Levine | B29C 61/0608 174/DIG. 8 |
| 5,048,572 A | 9/1991 | Levine | |
| 5,437,311 A * | 8/1995 | Reynolds | F16L 11/04 138/137 |
| D454,386 S * | 3/2002 | Speicher | D23/266 |
| 6,555,243 B2 * | 4/2003 | Flepp | B32B 27/30 264/513 |
| 7,322,379 B2 * | 1/2008 | Evans | B29C 48/337 138/121 |
| D632,751 S * | 2/2011 | Bowers | D22/108 |
| 7,878,222 B2 * | 2/2011 | Weisel | A01J 5/044 138/121 |
| 2010/0089484 A1 | 4/2010 | Courtois et al. | |

(Continued)

OTHER PUBLICATIONS

The Preliminary Search Report, dated Dec. 23, 2020, in the related French Appl. No. 2003524.

(Continued)

*Primary Examiner* — Patrick F Brinson (57) ABSTRACT

The invention relates to a thermoplastic moulded part able to constitute a duct of an aerial vehicle or space vehicle, to a method of manufacturing same, and to this duct which comprises said part. For example, provided is a part according to the invention, which has an external surface (2) with symmetry of revolution at least in part, is such that the external surface comprises a multitude of integrally moulded depressions (6) which are connected to one another in pairs by crests (7), and that:
  each of the depressions has a largest transverse dimension D between the adjacently paired crests of between 3 mm and 10 mm, measured in a direction d perpendicular to the crests delimiting each depression, and
  each of the crests has an apex of transverse width L measured in said direction d, where L<D.

21 Claims, 9 Drawing Sheets

(56) References Cited

U.S. PATENT DOCUMENTS

2010/0181434 A1    7/2010   Powell et al.
2016/0273696 A1    9/2016   Gonzalez et al.
2018/0305028 A1   10/2018   Guering et al.
2019/0101134 A1    4/2019   Beers et al.

OTHER PUBLICATIONS

Takashi Kuboki et al., "An extrusion method of tube with spiral inner fins by utilizing generation of spiral outer fins/grooves," CIRP Annals—Manufacturing Technology, vol. 67, Issue 1, pp. 305-308, Apr. 24, 2018.

* cited by examiner

THERMOPLASTIC MOULDED PART, METHOD FOR MANUFACTURING SAME, AND DUCT INCORPORATING SAME

CROSS-REFERENCE TO RELATED APPLICATIONS

This application claims priority from French Patent Application No. 20 03524, filed on Apr. 8, 2020. The French Patent Application is hereby incorporated by reference herein in its entirety.

FIELD OF THE INVENTION

The invention relates to a thermoplastic molded part able to constitute a duct of an aerial vehicle or space vehicle, to a method for manufacturing same, and to this duct which comprises said part. The invention applies in a general manner to any duct essentially constituted by said thermoplastic molded part that is able to resist cracking generated by impacts of tools during installation or maintenance operations within the vehicle, this duct being in particular configured for transferring a fluid, such as air, and advantageously being able to form all or part of an air intake, for example of the air inlet diffuser (or inlet air diffuser) type, so as to provide for the air-conditioning of the cabin of an aircraft both in flight and on the ground, with it being specified that the invention can apply to other types of ducts conveying a liquid or gaseous fluid and liable to be the site of external impacts, and also to fuel ducts, various fastenings and semistructural parts.

BACKGROUND OF THE INVENTION

FR 3 065 438 A1 presents an air-conditioning system intended to supply the cabin of an aircraft with conditioned air, comprising an air intake which is intended to be mounted below a belly fairing of an aircraft and which comprises for that purpose a scoop connected to an aperture in the fairing, and a sheath connected upstream to an air-conditioning apparatus and downstream to the scoop.

It has been sought to replace the metallic materials conventionally used for these air intakes with thermoplastic materials. Now, in a known manner, thermoplastic ducts and thermoplastic-matrix composites must have a trade-off between a satisfactory mechanical strength due to their reinforcement and/or to their stiffness, a significant lightening obtained by a reduced thickness and/or less dense materials, and, in applications such as the air intakes internal to aircraft, which are liable to be damaged by impacts of tools during the installation or the maintenance of the duct within the aircraft, an impact resistance generally obtained by a deformable but non-breakable structure or by a specific reinforcement.

WO 99/24749 A1 discloses an article, such as an aircraft or a duct made, for example, of plastic, which has reduced drag during the flow of a fluid by or through the article. To this end, the article comprises an internal or external surface having a plurality of concave and/or convex portions. That document does not concern the resistance of a duct to cracking resulting from impacts.

As far as the applicant is aware, there is currently not a thermoplastic duct or thermoplastic-matrix composite forming an air intake for an air-conditioning system of an aircraft, with the duct being capable of satisfactorily resisting cracking generated by impacts caused by tools being dropped or by other impacts possibly occurring during installation or maintenance operations on the aircraft.

SUMMARY OF THE INVENTION

An object of the present invention is to propose a molded thermoplastic-matrix part able to constitute a duct equipping an aerial vehicle or space vehicle, the part having an external surface with symmetry of revolution at least in part, which particularly overcomes the aforementioned disadvantages.

To this end, a molded part according to the invention is such that its external surface comprises a multitude of integrally molded depressions which are connected to one another in pairs by crests, and wherein:
- each of the depressions has a largest transverse dimension D between the adjacently paired crests of between 3 mm and 10 mm, measured in a direction d perpendicular to the crests delimiting each depression, and
- each of the crests has an apex of transverse width L measured in said direction d, where L<D.

It will be noted that a molded part according to the invention, which is preferably molded by injection-molding, has, by virtue of the molding carried out, a parting plane (molding plane). This molded part can have two open ends which each have, independently of one another, an essentially circular, elliptical or polygonal end periphery. By the term "essentially", it is meant throughout the present description that each related geometry is either as defined, or substantially as defined (e.g. mainly or generally circular, elliptical, polygonal, spherical, etc.).

What is to be understood by "depressions" in the present description are recesses, indentations or cells defining macroscopic locations set back from the crests on the external surface, thus imparting a macrotextured structure to said external surface. The depressions, which are identical or different, can form recesses which are concave or non-concave (for example of essentially rounded or polygonal, e.g. rectangular, cross section). The largest transverse dimension D between the crests, measured in a direction d perpendicular to the crests delimiting each depression, thus defines the largest transverse dimension of each depression (e.g. the diagonal or the diameter of each depression, when the latter has a prismatic, cylindrical or spherical shape), measured perpendicularly to the longitudinal axis or line of symmetry of each adjacent crest.

What is to be understood by "crests" in the present description are reliefs, crowns or ridges surmounting the depressions in the manner of likewise microscopic reliefs on said external surface. The crests, which are identical or different, have their respective apexes (which are furthest away from the depressions) which can be essentially planar, linear or curved (for example essentially convex or concave apexes). The transverse width L of each crest apex is likewise measured perpendicularly to the longitudinal axis or line of symmetry of each adjacent crest, with each crest apex which is narrower than each adjacent depression in said direction d (condition L<D).

The applicant has demonstrated that this arrangement of integrally molded depressions and crests makes it possible to significantly improve the resistance of the part to cracking due to impacts in comparison to a part constituted by the same material but with an external surface devoid of depressions and crests (i.e. without recesses or reliefs), as demonstrated in the following examples of the invention and comparative examples for molded parts constituted by the same thermoplastic-matrix composite material.

It will also be noted that this arrangement according to the invention, combined with an appropriate reinforced thermoplastic material for the molded part, makes it possible to impart to the latter a satisfactory resistance to bending impacts.

Advantageously, each of the depressions can have an essentially spherical concave surface (i.e. defined by a radius of curvature R) or essentially cylindrical concave surface (i.e. defined by a directrix forming a curved line essentially in the form of a circular arc with radius of curvature R and an axial generatrix for the duct defining the length of each depression), where preferably L<0.5 D and, for example, L<0.2 D, or even L<0.1 D.

What is to be understood by "essentially spherical" here is a concave surface defining an open sphere sector, for example a substantially hemispherical sector, and what is to be understood by "essentially semicylindrical" is an open cylinder sector, for example a substantially semicylindrical sector.

It will be noted that the depressions according to the invention can have recessed surfaces with variable profiles ranging for example from a parabolic profile to a rectangular profile, in order to vary the damping and the sensitivity of the crests in response to the impacts, as will be described below.

More advantageously still, the concave surface can be defined by said radius of curvature R linked to said largest transverse dimension D by 0.5 D<R<2 D, preferably 0.7 D<R<1.5 D.

According to another general feature of the invention, the part can have a difference in thickness, measured between each of the crests and a bottom of the adjacent depressions, from the external surface to a radially opposite internal surface of the part, of between 0.2 mm and 2 mm, preferably between 0.3 mm and 1.3 mm.

According to another general feature of the invention, the depressions can be advantageously identical and regularly spaced so as to form at least one peripheral row of depressions between two open ends of the part, the or each row being able to extend over a periphery of the external surface with a repetition pitch having a value equal to D+L between two consecutive depressions in the or each row.

It will be noted that the depressions can form:
in a first embodiment of the invention, a multitude of peripheral rows in the case where the concave surface of each depression is essentially spherical, these depressions then being able to be aligned over peripheries of the external surface of the part, or
in a second embodiment of the invention, a single said peripheral row in the case where the concave surface of each depression is essentially cylindrical, being defined by a cylinder sector of longitudinal axis along the external surface of the part essentially having symmetry of revolution.

Advantageously, said difference in thickness of the part as defined above can be between:
0.8 mm and 1.3 mm when said pitch between depressions is between 6 mm and 8 mm, where preferably 0.7 D<R<D, or
0.3 mm and 0.7 mm when said pitch between depressions is between 3 mm and 5 mm, where preferably D<R<1.3 D.

According to the first embodiment where the depressions form a plurality of said peripheral rows spaced on the external surface, the depressions of each row are formed discontinuously on the external surface in the manner of golf ball dimples.

According to the second embodiment where the depressions form a single peripheral row on the external surface, the depressions of said row each have an essentially semicylindrical concave continuous surface on the external surface.

According to another general feature of the invention, the part can be constituted by a polymeric composition based on at least one thermoplastic polymer chosen from among polyamides (PA), poly(phenylene sulfide) (PPS), polyether imides (PEI), polyphthalamides (PPA), polyphenylsulfones (PPSU), polyether ether ketones (PEEK), polyaryl ether ketones (PAEK) and polyvinylidene fluorides (PVDF).

Preferably, said at least one thermoplastic polymer is chosen from among polyether ether ketones (PEEK) and polyaryl ether ketones (PAEK).

More preferably still, said at least one thermoplastic polymer is a polyether ether ketone (PEEK).

According to another general feature of the invention, the composition can comprise a reinforcement comprising:
a reinforcing filler dispersed in the composition, for example chosen from among organic fillers, such as for example carbon blacks and carbon nanotubes, and inorganic fillers, and/or
reinforcing fibers, for example chosen from among glass fibers and carbon fibers, forming a unidirectional or woven reinforcement,
the reinforcement preferably comprising discontinuous glass fibers, for example in a mass fraction of between 20 and 40%.

More preferably still, said at least one thermoplastic polymer is chosen from among polyether ether ketones (PEEK) and polyaryl ether ketones (PAEK) and said reinforcement comprises discontinuous glass fibers in a mass fraction of between 25 and 35%.

It will be noted that a composition according to the invention can additionally comprise other additives usually used in thermoplastic compositions, such as dyes, by way of non-limiting example.

According to another general feature of the invention, the arrangement of the depressions and crests can be configured to deform during impacts while damping them by crushing of the crests, so as to make it easier to detect a crack in the part with a reduced impact energy, in comparison to the impact energy required to obtain a crack on a part having the same thickness and constituted by the same material but devoid of said arrangement.

A manufacturing method according to the invention for manufacturing a part as defined above is such that there is implemented a molding step by injecting, into a mold configured to negatively form said depressions and said crests, a polymeric composition comprising said thermoplastic matrix and possibly a reinforcement comprising a reinforcing filler dispersed in the composition and/or reinforcing fibers.

Preferably, the molding step comprises injecting the composition in which said at least one thermoplastic polymer is chosen from among polyamides (PA), poly(phenylene sulfide) (PPS), polyether imides (PEI), polyphthalamides (PPA), polyphenylsulfones (PPSU), polyether ether ketones (PEEK), polyaryl ether ketones (PAEK) and polyvinylidene fluorides (PVDF), and said reinforcement comprises discontinuous glass fibers, for example in a mass fraction of between 20 and 40%.

A duct for an aerial vehicle or space vehicle according to the invention is configured to be mounted within the vehicle while conveying a liquid or gaseous fluid therein, and the duct comprises or is constituted by a moulded part as defined above that is able to resist cracking of the part due to impact of tools during installation or maintenance operations in the vicinity of the duct.

It will be noted that a duct according to the invention can advantageously be single-layer, being constituted by said moulded composition and being optionally curved and/or elbowed.

According to one example of the invention, the duct forms an air intake (e.g. a cold-air inlet diffuser) for an air-conditioning unit of the vehicle so as to supply conditioned air to at least one cabin or passenger compartment of the vehicle, the duct comprising:

- a first open end of essentially circular or elliptical periphery that is configured to be connected in a leaktight manner, via a tightness seal, to a line of the air-conditioning unit opening inside the cabin or passenger compartment, and
- a second open end which has a widened cross section with respect to that of the first end and a, for example, essentially polygonal or oblong periphery, which is configured to be connected to an air-air heat exchanger of the vehicle, for example external to the cabin or passenger compartment.

Preferably, the duct according to this example of the invention has a passage cross section that increases from the first end to the second end, the duct being provided with means of connection to said air-conditioning unit. This duct can be an air intake diffuser of the scoop duct or inlet diffuser type, by way of non-limiting example.

It will be noted in a general manner that a duct according to the invention can be adapted for the transfer of a liquid or gaseous fluid other than air, such as for example a fuel.

BRIEF DESCRIPTION OF THE DRAWINGS

Other features, advantages and details of the present invention will become apparent from reading the following description of several exemplary embodiments of the invention given by way of illustration and in a non-limiting manner in relation to the appended drawings, in which.

Figure 1:
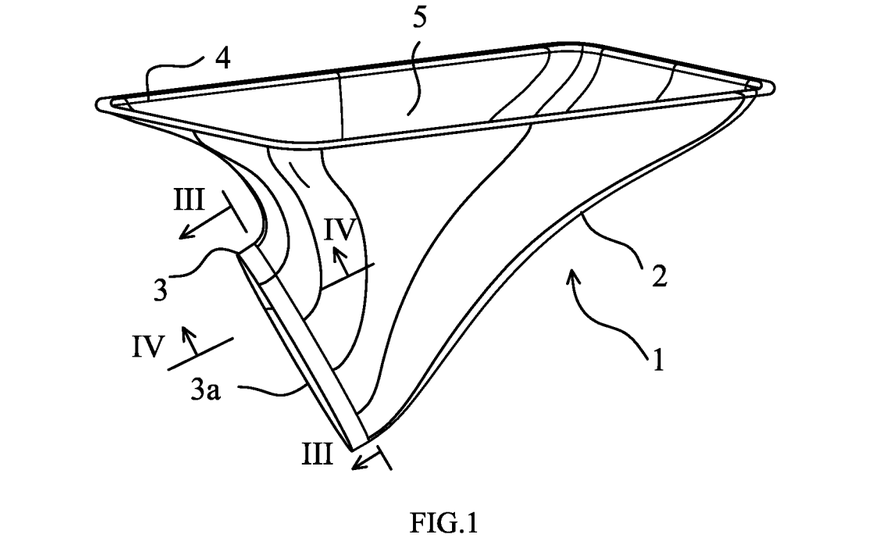
FIG. 1 is a lateral perspective view of a part according to one example of the invention forming an air duct of the air inlet diffuser type for an aircraft, the arrangement of the depressions and crests not being visible.

The duct 1 according to the example of the invention illustrated in FIG. 1, preferably molded by injection-molding and constituted by a thermoplastic composition or thermoplastic-matrix composite such as that defined above, is in particular configured to form an air intake to be connected to a circuit of an air-conditioning unit equipping an aircraft in order to condition its cabin when the aircraft is in flight and on the ground (i.e. permanently, as long as the cabin of the aircraft is occupied). The duct 1 has an external surface 2 comprising, in this example:

- an open lower end 3 of circular periphery provided with a tightness seal 3a so that it can be connected to a line or pipe of the air-conditioning unit opening inside the cabin (not visible), and
- an open upper end 4 of essentially rectangular periphery with rounded corners that is configured to be connected in a leaktight manner into an air-air heat exchanger of the vehicle (typically with exchange between the hot air emanating from the engine compartment(s) and the cold outside air), this exchanger being, for example, located in each wing of the aircraft.

The lower end 3 is extended by a lower portion of the external surface 2 with symmetry of revolution, of essentially curved cylindrical shape, which is extended progressively and continuously by an upper portion essentially in the form of a truncated pyramid with a rectangular base terminating in the upper end 4.

Figure 2:
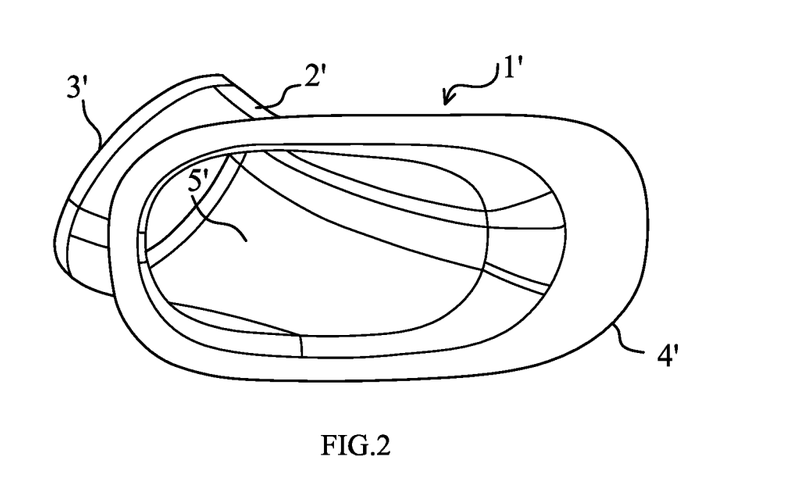
FIG. 2 is a perspective lateral view of a part according to another example of the invention forming another air duct for an aircraft of the scoop type, the arrangement of the depressions and crests not being visible either.

The duct 1' according to the example of the invention illustrated in FIG. 2, such as an air inlet diffuser of the scoop duct type, is essentially distinguished from the aforementioned duct 1 of FIG. 1 in that its external surface 2' comprises, on the opposite side from its lower end 3' to be connected to the line or pipe of the air-conditioning unit (similar to the end 3 of FIG. 1), an open upper end 4' to be connected to the air-air heat exchanger of the aircraft, which has an essentially oblong periphery and which is provided with a planar rim having a width greater than that of the rim of the upper end 4. The lower end 3' is also extended by an essentially curved cylindrical lower portion, which is progressively extended by a flared upper portion (of essentially truncated pyramid or substantially frustoconical shape) terminating in the upper end 4'.

The internal surface 5, 5' of the duct 1, 1' can have a smooth geometry, by contrast with the external surface 2, 2' which, according to the invention, comprises a multitude of integrally molded depressions 6, 6' which are connected to one another in pairs by crests 7, 7' (visible in FIGS. 3-6 and 8-11), where:

- each depression 6, 6' has a largest transverse dimension D between the adjacently paired crests 7, 7' of between 3 mm and 10 mm, measured in a direction d perpendicular to the crests 7, 7' delimiting each depression 6, 6', and
- each crest 7, 7' has an apex of transverse width L measured in said direction d, where L<D.

Figure 3:
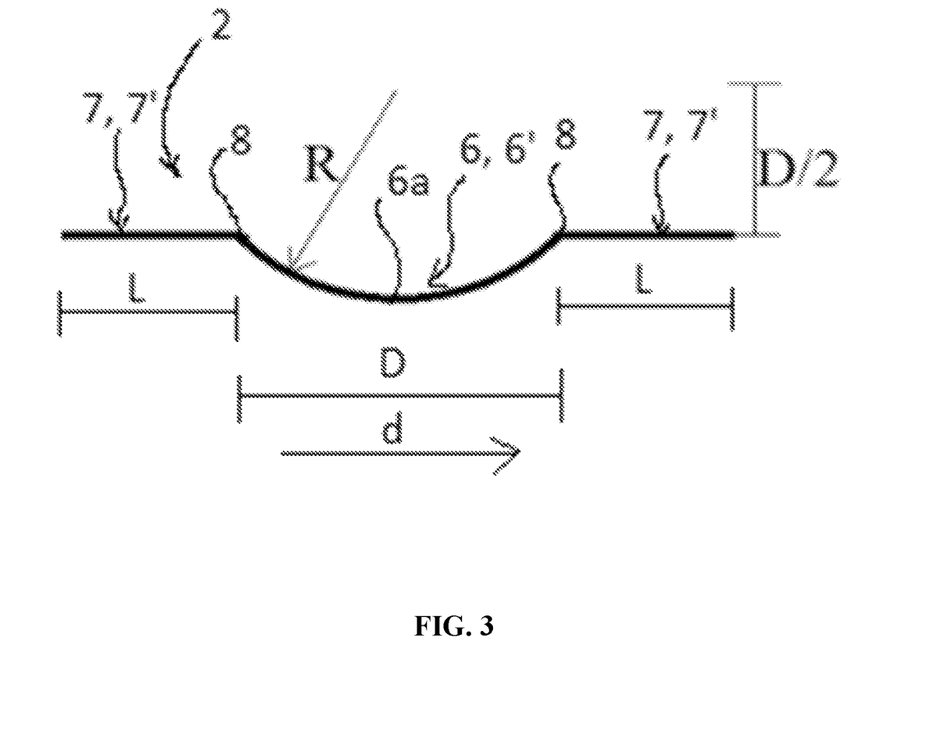
FIG. 3 is a partial schematic view in section in the plane III-III of FIG. 1 showing an example of an arrangement of a depression and of two adjacent crests of an external surface, an example common to the two embodiments of the invention with discontinuous and continuous depressions.
Figure 4:
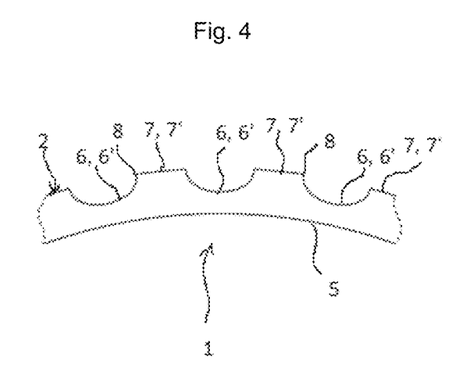
FIG. 4 is a partial schematic view in cross section showing more completely the example of the transverse arrangement of FIG. 3 for the two embodiments of the invention, and additionally showing an example of the longitudinal arrangement of the depressions and crests in the plane IV-IV of FIG. 1 for the first embodiment of the invention with discontinuous depressions.
Figure 5:
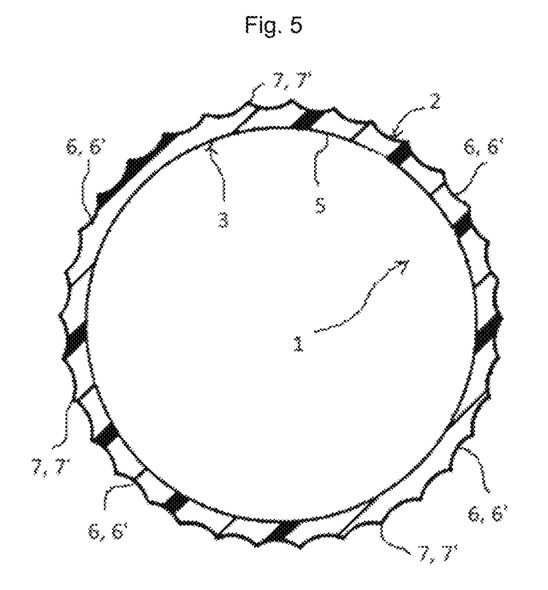
FIG. 5 is a complete schematic view in cross section of a part according to an example of the invention in the plane V-V of FIG. 2 or the plane III-III of FIG. 1, showing an example of the arrangement of the depressions and crests that is common to the two embodiments of the invention over a circumferential periphery of the part.

In the examples of FIGS. 3, 4 and 5 common to the first embodiment of the invention with discontinuous depressions (i.e. formed by essentially spherical sectors) and to the second embodiment of the invention with continuous depressions (i.e. formed by cylindrical sectors of parallel axes), it can be seen that each depression 6, 6' can have the same substantially hemispherical or semicylindrical concave surface with a bottom 6a and a radius R, where, for example, 0.5 D<R<2 D, preferably 0.7 D<R<1.5 D. Each depression 6, 6' extends with the dimension D from one salient edge 8 of one crest 7, 7' to another, adjacent salient edge 8 of at least one other crest 7, 7' delimiting the depression 6, 6', with it being specified that, in the schematic example of FIG. 5, the crests 7, 7' each have a smaller width D than the width D of each crest 7, 7' of FIGS. 3 and 4 (in other words, the crests 7, 7' of FIG. 5 are less flattened, i.e. more pointed than those of FIGS. 3 and 4).

Figure 7:
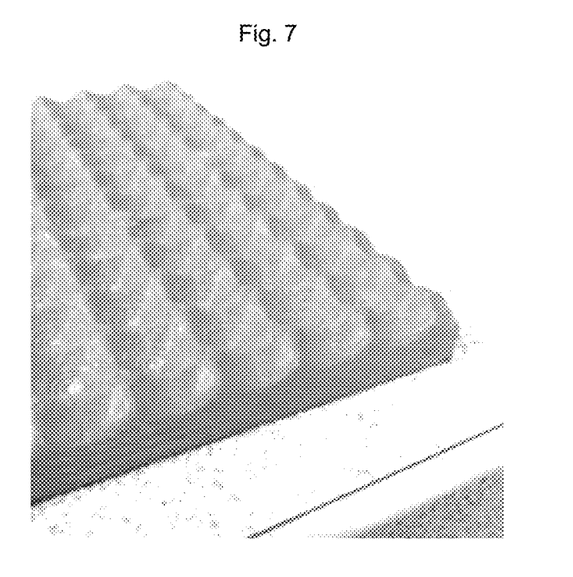
FIG. 7 is a photograph showing in a perspective top view an exemplary embodiment of an arrangement according to the first embodiment of the invention with discontinuous depressions and crests.

In the first embodiment of the invention of FIG. 7, it can be seen that the depressions 6, 6' of the duct 1, 1' each have a virtually hemispherical concave surface and that the crests 7, 7', which are relatively pointed (i.e. not very flattened), have an apex curved downwards between two adjacent crests 7, 7', with the respective bottoms 6a of the depressions 6, 6' which define the radially innermost points of the duct 1, 1' and the junctions between crests 7, 7' (in the example of FIG. 7, between four crests 7, 7' which are perpendicular in pairs) which define the radially outermost points of the duct 1, 1', with a maximum difference in thickness for the duct 1, 1' of, for example, between 0.2 mm and 2 mm. It can be seen that these depressions 6, 6' are thus arranged in a multitude of rows formed in a spaced manner on the external surface 2, 2' in the manner of golf ball dimples.

In the second embodiment of the invention illustrated in the photographs of FIGS. 8-11 and in the detail in FIGS. 3-5, it can be seen that the depressions 6, 6' of the duct 1, 1' each have an essentially semicylindrical concave surface (the longitudinal axes of symmetry formed by the generatrices of the semicylinders being parallel to one another) and that the crests 7, 7', which are substantially flat and also parallel to one another, each have an apex curved downwards between two adjacent crests 7, 7', with the bottoms 6a of the depressions 6, 6' which define the radially innermost points of the duct 1, 1' and the junctions between two consecutive crests 7, 7' (see FIGS. 8-11) which define the radially outermost points of the duct 1, 1', with a maximum difference in thickness for the duct 1, 1' of, for example, between 0.3 mm and 1.3 mm.

Tests on Specimens Having an External Surface According to the Invention

Specimens Tested

First molded parallelepipedal specimens were prepared by injection-molding one and the same thermoplastic-matrix polymeric composition such that first textured specimens obtained each had one of their two major surfaces which was textured according to FIG. 7 in accordance with the first embodiment of the invention (on account of the negative specific cavity of a first injection mold), and such that other first "control" specimens had each of their two major surfaces smooth.

Each first smooth specimen had dimensions of 950 mm×950 mm×7 mm and a mass of 46.6 g. Each first textured specimen had macro-cells of the type resembling those of a golf ball, a mass of 48.4 g and major surfaces of dimensions 950 mm×950 mm with a thickness defined by an average mesh of 7 mm of the macro-cells.

Second molded parallelepipedal specimens A, B, C, D, E, F were prepared by injection-molding one and the same composition with a PEEK thermoplastic matrix reinforced by 30% by mass of glass fibers (material bearing the tradename Victrex® 150GL30), the specimens A and B having one of their two major surfaces which was in accordance with the second embodiment of the invention of FIGS. 8-11 (on account of the negative specific cavity of a second injection mold), and the specimens C, D, E, F being "control" specimens having smooth major faces according to FIGS. 12-15. These second specimens A to F each had major surfaces of dimensions 120 mm×80 mm.

The injection-molding of all the specimens involved using molds of the plunger and die type, using a maximum pressure in the cavity of each mold of approximately 1500 bar, and a temperature in each mold of between 180 and 200° C.

More precisely, six identical specimens A1 to A6 each had a major textured surface according to FIGS. 8-9 with a reduced period (i.e. a high frequency) for the repetition of its semicylindrical depressions with longitudinal axes of symmetry parallel to one another, each specimen A1-A6 having the characteristics detailed in Table 1 below.

TABLE 1

| | |
|---|---|
| Minimum thickness (mm) | 2.5 |
| Thickness at the apex (mm) | 2.9 |
| Mass (g) | 38.9 |
| Spacing between opposite bearing points of each specimen (mm) | 100 |
| Radius of each depression (mm) | 5 |
| Repetition pitch of the depressions (mm) | 4.36 |

Nine identical specimens B1 to B9 each had a major textured surface according to FIGS. 10-11 with a higher period (i.e. smaller frequency) than that of FIGS. 8-9 for the repetition of its semicylindrical depressions with longitudinal axes of symmetry parallel to one another, each specimen B1-B9 having the characteristics detailed in Table 2 below.

TABLE 2

| | |
|---|---|
| Minimum thickness (mm) | 2.5 |
| Thickness at the apex (mm) | 3.6 |
| Mass (g) | 41.7 |
| Spacing between opposite bearing points of each specimen (mm) | 100 |
| Radius of each depression (mm) | 5 |
| Repetition pitch of the depressions (mm) | 6.95 |

Six identical "control" specimens C1-C6 with the two smooth major surfaces each had the characteristics detailed in Table 3 below.

TABLE 3

| | |
|---|---|
| Thickness (mm) | 2 |
| Mass (g) | 29.7 |
| Spacing between opposite bearing points of each specimen (mm) | 100 |

Six identical "control" specimens D1-D6 with the two smooth major surfaces each had the characteristics detailed in Table 4 below.

TABLE 4

| | |
|---|---|
| Thickness (mm) | 3 |
| Mass (g) | 44.25 |
| Spacing between opposite bearing points of each specimen (mm) | 100 |

Five identical "control" specimens E1-E5 with the two smooth major surfaces each had the characteristics detailed in Table 5 below.

TABLE 5

| | |
|---|---|
| Thickness (mm) | 4 |
| Mass (g) | 56.75 |
| Spacing between opposite bearing points of each specimen (mm) | 100 |

Five identical "control" specimens F1-F5 with the two smooth major surfaces each had the characteristics detailed in Table 6 below.

TABLE 6

| | |
|---|---|
| Thickness (mm) | 5 |
| Mass (g) | 73 |
| Spacing between opposite bearing points of each specimen (mm) | 100 |

Implementation of the Impact Tests on These Specimens and Results

Figure 6:
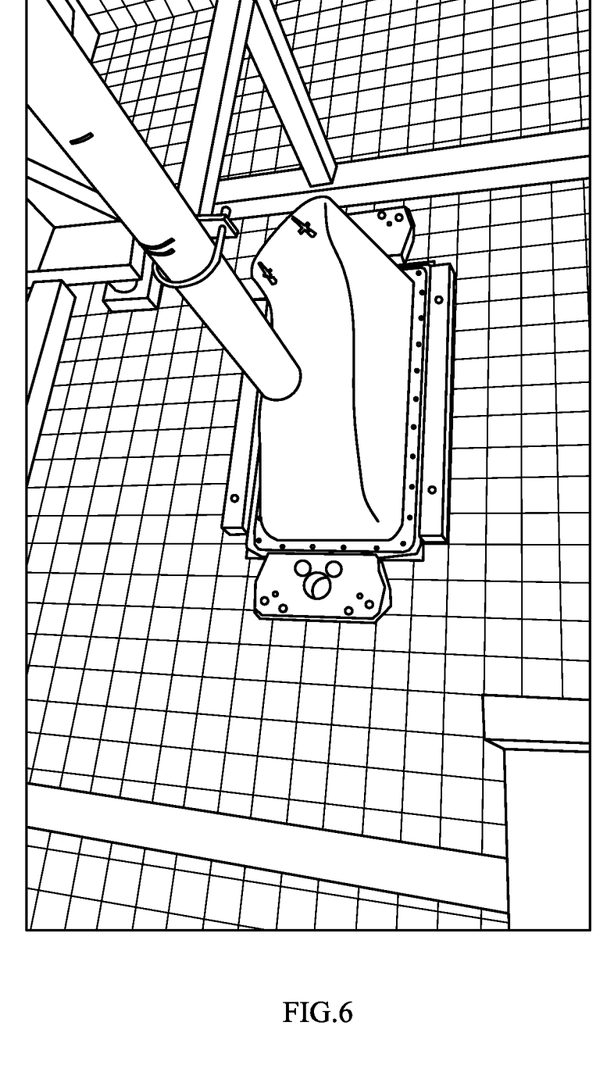
FIG. 6 is a photograph showing in a perspective top view a device for evaluating the impact behavior used for testing parts and "control" specimens and according to the two embodiments of the invention, comprising an impactor with variation of the impact energy.

Use was made of the drop weight tower illustrated in FIG. 6, beneath which there can be seen a duct according to the invention of the type illustrated in FIG. 1 intended to be subjected to these impact tests. A spherical impactor with a diameter equal to 16 mm (the radius of the impactor being greater than the radius of each semicylindrical depression for the specimens A and B) was used by varying the impact energy according to the well-known law of mechanics $E=m \cdot g \cdot z$ (where m is the mass, g is the acceleration due to gravity and z is the drop height). There was chosen a constant drop height z of 1 m to release masses m of increasing value on the aforementioned specimens, the latter being placed (either flat or bearing on two spaced-apart supports for bending impacts) beneath the drop weight tower, the objective in the impact tests being to determine the limit impact energy value beyond which each specimen reveals visible damage such as a crack or breakage of each specimen.

First Specimens According to FIG. 7:

The impact tests carried out on the first specimens having a textured major face according to the first embodiment of the invention showed an improved limit impact energy before visible damage as compared with that of the first smooth specimens of the same thickness, demonstrating an improved impact resistance in relation to the latter.

Figure 8:
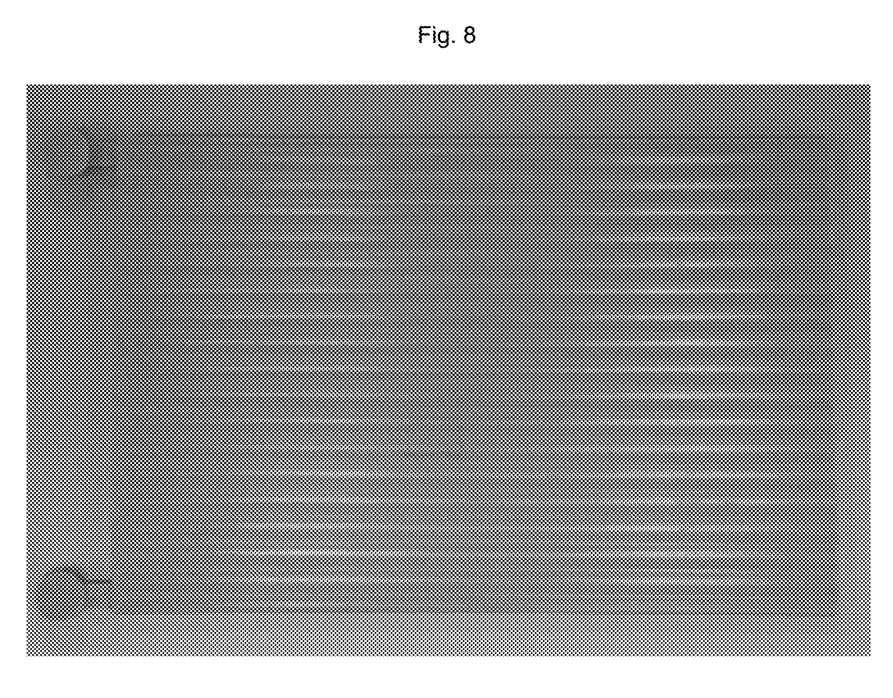
FIG. 8 is a photograph showing in a top view the external surface of a first specimen A2 formed by a molded sheet whose external surface is provided with a tight arrangement of continuous depressions and crests according to the second embodiment of the invention, this specimen being constituted by a material according to the invention and having been impacted on two occasions by the device of FIG. 6 with an impact energy of 3.5 J.
Figure 9:
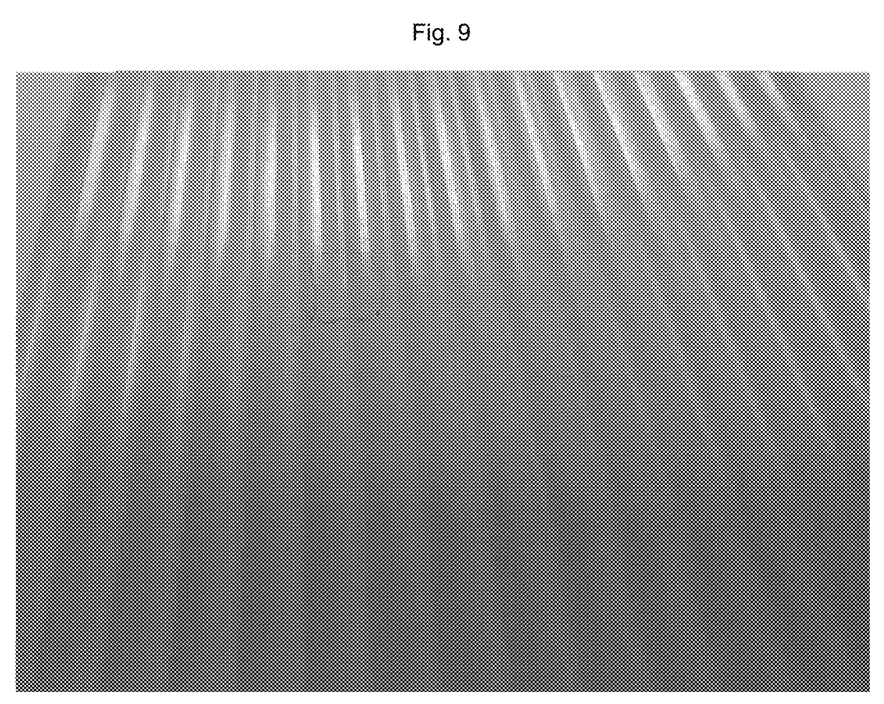
FIG. 9 is a photograph detailing in perspective the continuous depressions and crests of the first specimen A2 of FIG. 8.

Second Specimens A1-A6 According to FIGS. 8-9:

Table 7 below details the results of the tests carried out for each specimen A1 to A6, in terms of impact energy, of status of the specimen (good or poor state) after a first impact and possibly after a second impact for a given impact energy, and of identification of the visible damage after each impact (comments concerning the impacted textured outer side of each specimen, provided that it is not broken subsequent to each impact).

TABLE 7

| Specimen | Impact energy (J) | Status of impact No 1 | Comment on impact No 1 | Status of impact No 2 | Comment on impact No 2 |
|---|---|---|---|---|---|
| A1 | 3.0 | Good | Mark on outer side | Good | Mark on outer side |
| A2 | 3.5 | Good | Mark on outer side | Good | Mark on outer side |
| A3 | 4.0 | Poor | Complete breakage | — | — |
| A4 | 3.7 | Poor | Complete breakage | — | — |
| A5 | 3.6 | Poor | Complete breakage | — | — |
| A6 | 3.5 | Good | Mark on outer side | Good | Mark on outer side |

Table 7 shows that the limit impact energy before rupture for the specimens A1-A6 was 3.5 J.

Figure 10:
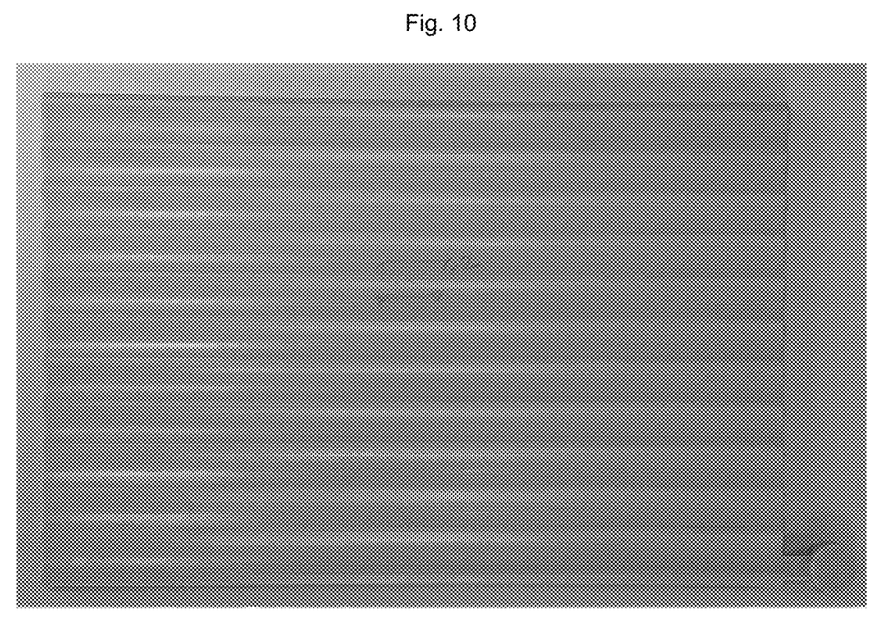
FIG. 10 is a photograph showing in a top view the external surface of a second specimen B7 formed by a molded sheet whose external surface is provided with another, more spaced arrangement of continuous depressions and crests according to the second embodiment of the invention, this specimen being constituted by a material according to the invention and having been impacted on two occasions by the device of FIG. 6 with an impact energy of 3.8 J.
Figure 11:
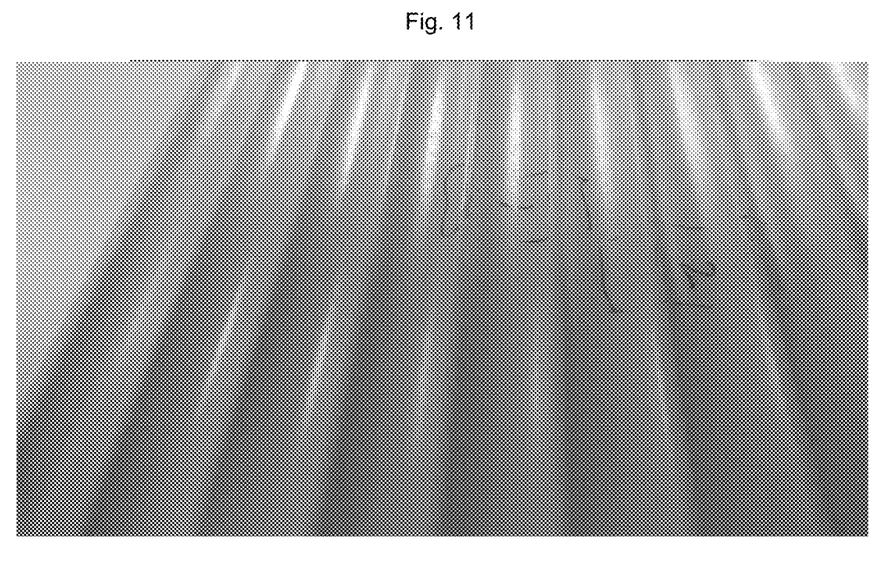
FIG. 11 is a photograph detailing in perspective the continuous depressions and crests of the second specimen B7 of FIG. 10.

Second Specimens B1-B9 According to FIGS. 10-11:

Table 8 below details the results of the tests carried out for each specimen B1 to B9, in terms of impact energy, of status of the specimen (good or poor state) after a first impact and possibly after a second impact for a given impact energy, and of identification of the visible damage after each impact (comments concerning the impacted textured outer side of each specimen, provided that it is not broken subsequent to each impact).

TABLE 8

| Specimen | Impact energy (J) | Status of impact No 1 | Comment on impact No 1 | Status of impact No 2 | Comment on impact No 2 |
|---|---|---|---|---|---|
| B1 | 3.0 | Good | Mark on outer side sensitive to the touch | Good | Mark on outer side |
| B2 | 3.2 | Good | Mark on outer side | Good | Mark on outer side |
| B3 | 3.5 | Good | Mark on outer side | Good | Mark on outer side |
| B4 | 3.6 | Good | Mark on outer side sensitive to the touch | Good | Mark on outer side |
| B5 | 4.0 | Poor | Complete breakage | — | — |
| B6 | 3.7 | Good | Mark on outer side | Good | Mark on outer side |
| B7 | 3.8 | Good | Mark on outer side | Good | Mark on outer side |
| B8 | 3.9 | Poor | Complete breakage | — | — |
| B9 | 3.8 | Good | Mark on outer side | Good | Mark on outer side |

Table 8 shows that the limit impact energy before rupture for the specimens B1-B9 was 3.8 J.

Figure 12:
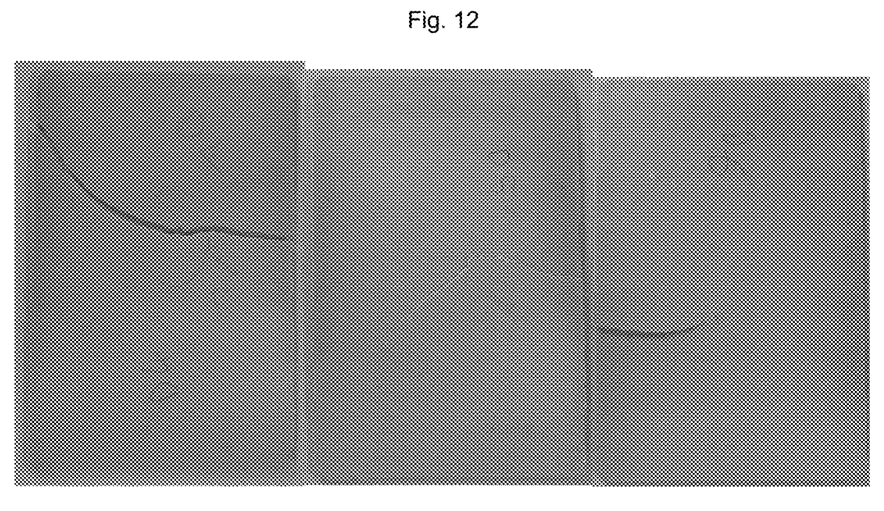
FIG. 12 contains three photographs showing in a top view the external surfaces of three "control" specimens C4, C5, C6 formed by 2 mm-thick molded sheets whose external surface is planar and which are constituted by the same material according to the invention, with those on the left and in the centre impacted on two occasions with an impact energy of 2 J, and that on the right on one occasion with an impact energy of 2 J.

"Control" Specimens C1-C6 According to FIG. 12:

Table 9 below details the results of the tests carried out for each specimen C1 to C6, in terms of impact energy, of status of the specimen (good or poor state) after a first impact and possibly after a second impact for a given impact energy, and of identification of the visible damage after each impact (comments concerning the impacted textured outer side of each specimen, provided that it is not broken subsequent to each impact).

TABLE 9

| Specimen | Impact energy (J) | Status of impact No 1 | Comment on impact No 1 | Status of impact No 2 | Comment on impact No 2 |
|---|---|---|---|---|---|
| C1 | 3.5 | Poor | Complete breakage | — | — |
| C2 | 3.0 | Poor | Complete breakage | — | — |
| C3 | 2.5 | Poor | Partial breakage | — | — |
| C4 | 2.0 | Good | No mark | Poor | Complete breakage |
| C5 | 2.0 | Good | Mark on outer side | Poor | Partial breakage |
| C6 | 2.0 | Poor | Partial breakage | — | — |

Table 9 shows that the limit impact energy before rupture for the specimens C1-C6 was less than 2.0 J.

Figure 13:
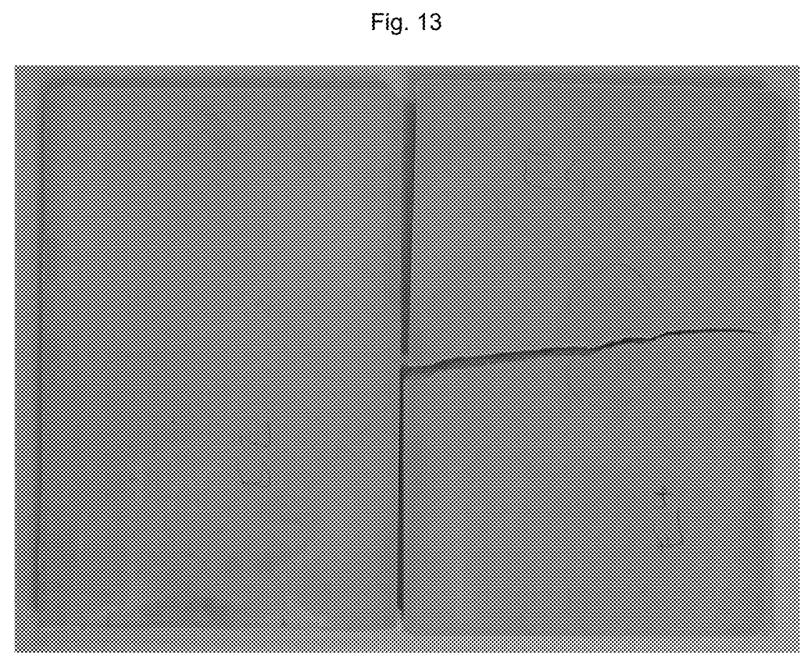
FIG. 13 contains two photographs showing in a top view the external surfaces of two "control" specimens D2, D4 formed by 3 mm-thick molded sheets whose external surface is planar and which are constituted by the same material according to the invention, with those on the left and right impacted on two occasions with an impact energy of 2 J and 2.5 J, respectively.

"Control" Specimens D1-D6 According to FIG. 13:

Table 10 below details the results of the tests carried out for each specimen D1 to D6, in terms of impact energy, of status of the specimen (good or poor state) after a first impact and possibly after a second impact for a given impact energy, and of identification of the visible damage after each impact (comments concerning the impacted textured outer side of each specimen, provided that it is not broken subsequent to each impact).

TABLE 10

| Specimen | Impact energy (J) | Status of impact No 1 | Comment on impact No 1 | Status of impact No 2 | Comment on impact No 2 |
|---|---|---|---|---|---|
| D1 | 2.0 | Poor | Interior crack | — | — |
| D2 | 2.0 | Good | Mark on outer side | Poor | Interior crack |
| D3 | 2.0 | Good | Mark on outer side | Good | Mark on outer side |
| D4 | 2.5 | Good | Mark on outer side | Poor | Complete breakage |
| D5 | 2.5 | Poor | Complete breakage | — | — |
| D6 | 2.5 | Good | Mark on outer side | Good | Mark on outer side |

Table 10 shows that the limit impact energy before rupture for the specimens D1-D6 was 2.0 J.

Figure 14:
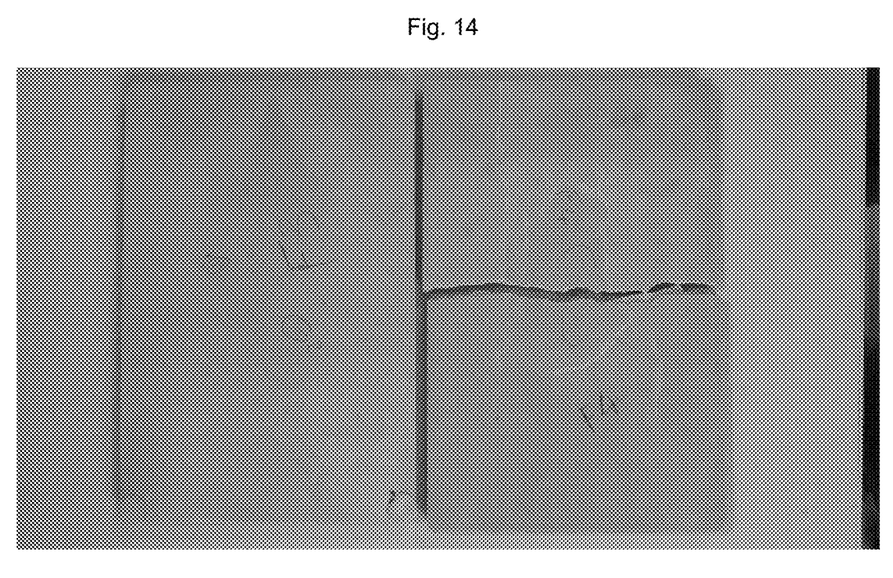
FIG. 14 contains two photographs showing in a top view the external surfaces of two "control" specimens E3, E4 formed by 4 mm-thick molded sheets whose external surface is planar and which are constituted by the same material according to the invention, with those on the left and right impacted on two occasions with an impact energy of 3.5 J and 4 J, respectively.

"Control" Specimens E1-E5 According to FIG. 14:

Table 11 below details the results of the tests carried out for each specimen E1 to E5, in terms of impact energy, of status of the specimen (good or poor state) after a first impact and possibly after a second impact for a given impact energy, and of identification of the visible damage after each impact (comments concerning the impacted textured outer side of each specimen, provided that it is not broken subsequent to each impact).

TABLE 11

| Specimen | Impact energy (J) | Status of impact No 1 | Comment on impact No 1 | Status of impact No 2 | Comment on impact No 2 |
|---|---|---|---|---|---|
| E1 | 2.5 | Good | Mark on outer side | Good | Mark on outer side |
| E2 | 3.0 | Good | Mark on outer side | Good | Mark on outer side |
| E3 | 3.5 | Good | Mark on outer side | Good | Mark on outer side |
| E4 | 4.0 | Good | Mark on outer side | Poor | Complete breakage |
| E5 | 4.0 | Poor | Complete breakage | — | — |

Table 11 shows that the limit impact energy before rupture for the specimens E1-E5 was between 3.5 and 4.0 J.

Figure 15:
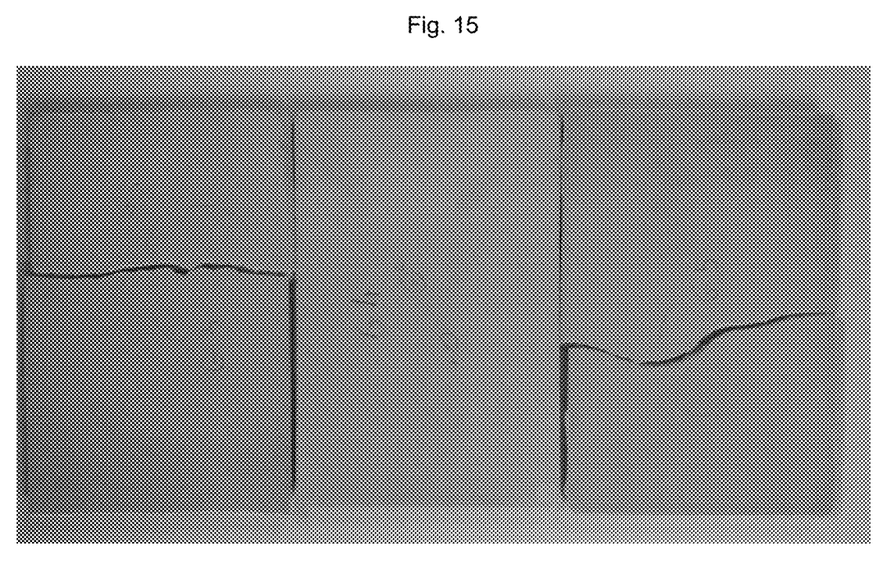
FIG. 15 contains three photographs showing in a top view the external surfaces of three "control" specimens F3, F4, F5 formed by 5 mm-thick molded sheets whose external surface is planar and which are constituted by the same material according to the invention, with those on the left, in the center and on the right impacted with an impact energy of 8 J, 7 J and 7.5 J, respectively.

"Control" Specimens F1-F5 According to FIG. 15:

Table 12 below details the results of the tests carried out for each specimen F1 to F5, in terms of impact energy, of status of the specimen (good or poor state) after a first impact and possibly after a second impact for a given impact energy, and of identification of the visible damage after each impact (comments concerning the impacted textured outer side of each specimen, provided that it is not broken subsequent to each impact).

TABLE 12

| Specimen | Impact energy (J) | Status of impact No 1 | Comment on impact No 1 | Status of impact No 2 | Comment on impact No 2 |
|---|---|---|---|---|---|
| F1 | 5.0 | Good | Mark on outer side | Good | Mark on outer side |
| F2 | 6.0 | Good | Mark on outer side | Good | Mark on outer side |
| F3 | 8.0 | Poor | Complete breakage | — | — |
| F4 | 7.0 | Good | Mark on outer side | Good | Mark on outer side |
| F5 | 7.5 | Poor | Complete breakage | — | — |

Table 12 shows that the limit impact energy before rupture for the specimens F1-F5 was between 7.0 and 7.5 J.

These tests show that the textured surfaces according to FIGS. 7-11 make it possible, for parts according to the invention, to delay the appearance of a crack subsequent to impacts received, by virtue of the crushing of the relief formed by the crests and the depressions during the damping of these impacts by comparison with smooth parts of equivalent thickness, and of initiating early warning monitoring of the textured part according to the invention.

In particular, Tables 7 and 8 show that the textured surfaces according to the second embodiment of the invention provide the specimens A and B incorporating them with a markedly increased limit impact energy before rupture, and hence a significantly improved impact resistance, by comparison with the specimens C and D of equivalent thicknesses ranging from 2 mm to 3 mm (see Tables 9 and 10).

Table 11 shows that the thickness of the "control" specimens (see specimen E) needs to be increased to 4 mm in order to obtain an equivalent limit impact energy before rupture (of between 3.5 and 4.0 J), that is to say a mass gain of approximately 25% for the parts A and B according to the two embodiments of the invention.

These results also show an increase in the limit impact energy before rupture with the thickness of the specimens (see Tables 7-8 for specimens A and B, and Tables 9-12 for specimens C-F).

The results of Tables 7-8 for the second embodiment of the textured surface according to the invention additionally show that the spacing of the crests and depressions with a high repetition period (i.e. a reduced frequency or repetition pitch affording a more spaced-apart arrangement of the crests/depressions) constitutes a preferred exemplary embodiment of the invention, given that the limit impact energy before rupture is 3.8 J for FIGS. 10-11 versus 3.5 J for FIGS. 8-9.

This preferred example of the invention of FIGS. 10-11 is manifested in particular by a higher "drop" (i.e. difference in thickness between the crests and the bottoms of the depressions) and by an increased thickness of the part by comparison with the variant of the invention of FIGS. 8 and 9.

The invention claimed is:

1. An injection-molded thermoplastic-matrix part able to constitute a duct equipping an aerial vehicle or space vehicle, the part having an external surface with symmetry of revolution at least in part, wherein the external surface comprises a multitude of integrally injection-molded depressions connected in pairs to one another by crests, and wherein:

each of the depressions has a largest transverse dimension D between the adjacently paired crests of between 3 mm and 10 mm, measured in a direction d perpendicular to the crests delimiting each depression, and each of the crests has an apex of transverse width L measured in said direction d, where L<D, wherein each of the integrally injection-molded depressions has an essentially spherical or cylindrical concave surface.

2. The part according to claim 1, wherein L<0.5 D.

3. The part according to claim 2, wherein L<0.2 D.

4. The part according to claim 2, wherein the concave surface is defined by a radius of curvature R linked to said largest transverse dimension D by 0.5 D<R<2 D.

5. The part according to claim 4, wherein the concave surface is defined by said radius of curvature R linked to said largest transverse dimension D by 0.7 D<R<1.5 D.

6. The part according to claim 1, wherein the part has a difference in thickness, measured between each of the crests and a bottom of the adjacent integrally injection-molded depressions from the external surface to a radially opposite internal surface of the part, of between 0.2 mm and 2 mm.

7. The part according to claim 6, wherein the part has said difference in thickness of between 0.3 mm and 1.3 mm.

8. The part according to claim 1, wherein the integrally injection-molded depressions are identical and regularly spaced so as to form at least one peripheral row of integrally injection-molded depressions between two open ends of the part, the or each row extending over a periphery of the external surface with a repetition pitch having a value equal to D+L between two consecutive integrally injection-molded depressions in the or each row.

9. The part according to claim 6 or 8, wherein said difference in thickness of the part is between:
0.8 mm and 1.3 mm when said pitch between integrally injection-molded depressions is between 6 mm and 8 mm, or
0.3 mm and 0.7 mm when said pitch between integrally injection-molded depressions is between 3 mm and 5 mm.

10. The part according to claim 9, wherein said difference in thickness of the part is between:
0.8 mm and 1.3 mm when said pitch between integrally injection-molded depressions is between 6 mm and 8 mm, where 0.7 D<R<D, or
0.3 mm and 0.7 mm when said pitch between integrally injection-molded depressions is between 3 mm and 5 mm, where D<R<1.3 D.

11. The part according to claim 8, wherein the integrally injection-molded depressions form a plurality of said peripheral rows spaced over the external surface, the integrally injection-molded depressions of each row each having an essentially spherical concave surface and being formed discontinuously on the external surface in the manner of golf ball dimples.

12. The part according to claim 8, wherein the integrally injection-molded depressions form a peripheral row on the external surface, the integrally injection-molded depressions of said row each having a continuous essentially semicylindrical concave surface on the external surface.

13. The part according to claim 1, wherein the part has two open ends which each have, independently of one another, an essentially circular, elliptical or polygonal end periphery.

14. The part according to claim 1, wherein the part is constituted by a polymeric composition based on at least one thermoplastic polymer chosen from among polyamides (PA), poly(phenylene sulfide) (PPS), polyether imides (PEI), polyphthalamides (PPA), polyphenylsulfones (PPSU), polyether ether ketones (PEEK), polyaryl ether ketones (PAEK) and polyvinylidene fluorides (PVDF).

15. The part according to claim 14, wherein the composition comprises a reinforcement comprising:
a reinforcing filler dispersed in the composition chosen from among organic fillers including carbon blacks and carbon nanotubes, and inorganic fillers, and/or
reinforcing fibres chosen from among glass fibres and carbon fibres, forming a unidirectional or woven reinforcement.

16. The part according to claim 15, wherein the reinforcement comprises discontinuous glass fibres in a mass fraction of between 20 and 40%.

17. A method for manufacturing a part according to claim 1, wherein there is implemented a step of injection-molding, in a mold configured to negatively form said integrally injection-molded depressions and said crests of a polymeric composition comprising said thermoplastic matrix and possibly a reinforcement comprising a reinforcing filler dispersed in the composition and/or reinforcing fibres.

18. A duct for an aerial vehicle or space vehicle, the duct being configured to be mounted within the vehicle while conveying a liquid or gaseous fluid therein, wherein the duct comprises or is constituted by a part according to claim 1 that is able to resist cracking of the part due to impacts of tools during installation or maintenance operations in the vicinity of the duct.

19. The duct according to claim 18, wherein the duct forms an air intake for an air-conditioning unit of the vehicle so as to supply conditioned air to at least one cabin or passenger compartment of the vehicle, the duct comprising:
a first open end of an essentially circular or elliptical periphery that is configured to be connected in a leaktight manner to a line of the air-conditioning unit opening inside the cabin or passenger compartment, and
a second open end which has a widened cross section with respect to that of the first end, which is configured to be connected to an air-air heat exchanger of the vehicle.

20. The duct according to claim 19, wherein said second open end has an essentially polygonal or oblong periphery which is configured to be connected to an air-air heat exchanger of the vehicle external to the cabin or passenger compartment.

21. The duct according to claim 19, wherein the duct has a passage cross section that increases from the first end to the second end, the duct being provided with means of connection to said air-conditioning unit.

* * * * *